United States Patent [19]

Böhm et al.

[11] 4,117,866
[45] Oct. 3, 1978

[54] HOLLOW BODY AND METHOD OF MAKING THE SAME

[76] Inventors: Gerhard Böhm, Eibenweg 15, 7016 Gerlingen; Rolf Mayer, Kastanienstr. 27, Winnenden-Schelmenholz, both of Germany

[21] Appl. No.: 691,411

[22] Filed: Jun. 1, 1976

Related U.S. Application Data

[63] Continuation of Ser. No. 517,827, Oct. 24, 1974, abandoned.

[30] Foreign Application Priority Data

Nov. 13, 1973 [DE] Fed. Rep. of Germany ....... 2356796

[51] Int. Cl.² .............................................. F16L 55/04
[52] U.S. Cl. ..................................................... 138/30
[58] Field of Search ........................ 138/30; 220/85 B; 228/184; 285/270, 397

[56] References Cited

U.S. PATENT DOCUMENTS

| | | | |
|---|---|---|---|
| 2,125,324 | 8/1938 | Williams et al. | 285/397 X |
| 2,153,494 | 4/1939 | Arutunoff | 285/370 X |
| 2,345,124 | 3/1944 | Hu ber | 138/30 |
| 2,386,246 | 10/1945 | Mapes | 29/148.2 |
| 2,421,596 | 6/1947 | Bruce et al. | 285/189 |
| 2,646,995 | 7/1953 | Thompson | 285/397 X |
| 3,064,608 | 11/1962 | Karmazin | 220/81 R X |
| 3,365,786 | 1/1968 | Takemuro et al. | 220/3 X |
| 3,425,593 | 2/1969 | Kramer et al. | 138/30 X |
| 3,632,512 | 11/1971 | Ellwanger et al. | 138/30 |
| 3,868,972 | 3/1975 | Zirps | 138/30 |
| 3,948,287 | 4/1976 | Sugimura et al. | 138/30 |

*Primary Examiner*—Richard E. Aegerter
*Assistant Examiner*—James E. Bryant, III
*Attorney, Agent, or Firm*—Michael J. Striker

[57] ABSTRACT

A hollow body, especially a pressure vessel, which includes two hollow outer parts abutting with annular end faces against each other, which define together a substantially V-shaped groove ending at its apex short of the inner surfaces of the outer parts. The outer parts are aligned with each other by an inner tubular part which extends to opposite sides of the end faces of the outer parts in close proximity with the inner surfaces of the latter. A weld seam filling the V-shaped groove connects the outer parts to each other and fusible material between the outer surface of the inner part and the inner surfaces of the outer parts join these parts to each other. The pressure vessel preferably includes also a flexible membrane having adjacent its outer edge a bead located in a groove formed in the inner part and held therein by a retaining ring.

1 Claim, 2 Drawing Figures

4,117,866

HOLLOW BODY AND METHOD OF MAKING THE SAME

This is a continuation of application Ser. No. 517,827, filed Oct. 24, 1974, now abandoned.

BACKGROUND OF THE INVENTION

The present invention relates to a hollow body, especially a pressure vessel, composed of at least three main parts, that is of two hollow outer parts connected at annular end faces thereof by a weld seam and a tubular inner part which aligns the two outer parts with each other, as well as to a method of making the hollow body.

It is known to connect the various parts of such hollow bodies in such a manner that the inner part is connected to the outer parts by the weld seam which connects the outer parts to each other, that is the apex of the weld seam extends up to the inner part to connect thereby also the latter to the outer parts. In such an arrangement it may happen that the welding arc extending between the flanks to be welded to each other will cause the electrode material to form a bridge over the inner part and the thereby produced cavities will detrimentally affect the strength and especially the gas-tightness of the weld seam.

SUMMARY OF THE INVENTION

It is an object of the present invention to provide a hollow body and a method for making the same in which the above-mentioned disadvantages in constructing such hollow bodies are avoided.

It is a further object of the present invention to provide a hollow body and a method of making the same in which the strength of the connection of the various parts of the hollow body is improved and in which a gas-tight connection of the various parts of the hollow body is assured.

With these and other objects in view, which will become apparent as the description proceeds, the hollow body of the present invention mainly comprises two hollow outer parts having annular end faces defining together a substantially V-shaped groove ending at its apex short of the inner surfaces of these outer parts, an inner tubular part extending to opposite sides of the aforementioned end faces of the outer parts and having an outer surface closely adjacent to the inner surfaces of the outer parts to align the latter with each other, and a weld seam filling the aforementioned V-shaped groove and connecting the outer parts to each other. In addition, one of the outer parts has at the end face thereof an annular projection extending beyond the apex of the V-shaped groove and the other of the outer parts being provided at the end face thereof with a groove receiving the aforementioned projection, and a fusible material is provided between the outer surface of the inner part and the inner surface of at least one of the outer parts for joining these parts to each other.

In this arrangement the weld seam connecting the two outer parts does not also connect the inner part with the outer parts. In this way, the gas-tightness of the connection is not detrimentally affected even if sporadic cavities occur in the weld seam. The connection of the inner part with the outer parts is effected by a soldering process, which however is carried out simultaneously with the welding process. The necessary heat for the soldering process is obtained by the welding process. Thus, the production of the hollow body does not require any additional expenditure. The production of the hollow body is carried out preferably by automatic welding, whereby a uniform feeding speed and a uniform heat flux during the welding is assured. This manner of connection has the additional advantage that it may be exactly calculated, which is not possible during connection of three parts with a single weld seam.

The invention is not limited for the construction of pressure vessels, but it is also possible to produce pipes or other hollow bodies in accordance with the method of the present invention.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
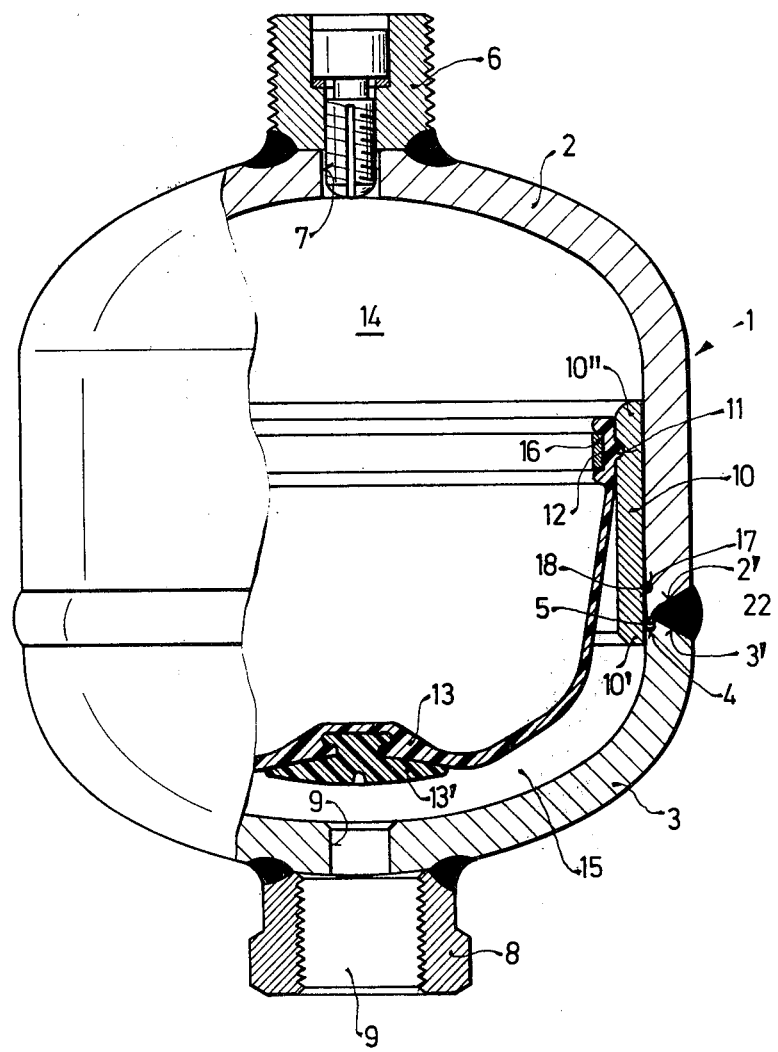
FIG. 1 is a side view, partly in cross section through a pressure vessel according to the present invention.

As shown in FIG. 1, the pressure vessel 1 according to the present invention comprises a substantially hollow cup-shaped upper part 2 and a similar lower part 3. These parts have at end faces thereof the same outer and inner diameters. The end faces of the two hollow parts 2 and 3 are beveled at 2', respectively 3', so that when the two parts abut against each other they form at the end faces thereof a V-shaped groove. The apex of this V-shaped groove does, however, not extend up to the inner surfaces of the two parts 2 and 3. The lower part 3 is provided at the inner surface thereof with an annular groove 4 of rectangular cross-section in which a correspondingly shaped annular projection 5 of the upper part 2 is engaged. The radial thickness of the annular projection 5 is however, as compared with the wall thickness of the two parts, relatively small. The upper part 2 is provided at its upper end with a nipple 6 through which a bore 7 extends into the interior of the upper part. A similar nipple 8 is provided on the lower part 3, which is likewise provided with a bore 9 extending into the interior of the lower part.

A tubular member or part 10 is arranged on the inner surface of the two parts 2 and 3, and the lower edge 10' thereof projects a relatively small distance beyond the projection 5. The outer diameter of the tubular member 10 is chosen in such a manner that the two outer parts 2 and 3 will fit with a pushfit thereon. The tubular member 10 is provided adjacent its upper edge 10" and on its inner surface with an annular groove 11. An annular bead 12, provided near the upper edge of a flexible membrane 13, which divides the interior of the hollow body formed by the two outer parts 2 and 3 into two compartments 14 and 15, is located in the annular groove 11. The upper edge of the membrane 13 and especially the annular bead 12 thereof are pressed by a retaining ring 13 against the inner surface of the tubular member 10. An annular groove 17 of relatively small cross section is formed at the inner surface of the outlet part 2 slightly above the V-shaped groove formed by the beveled faces 2' and 3'. A soldering wire 18 is located in the groove 17. A button 13' for closing the opening of a bore 9 is provided at the lower closed portion of the membrane 13.

Figure 2:
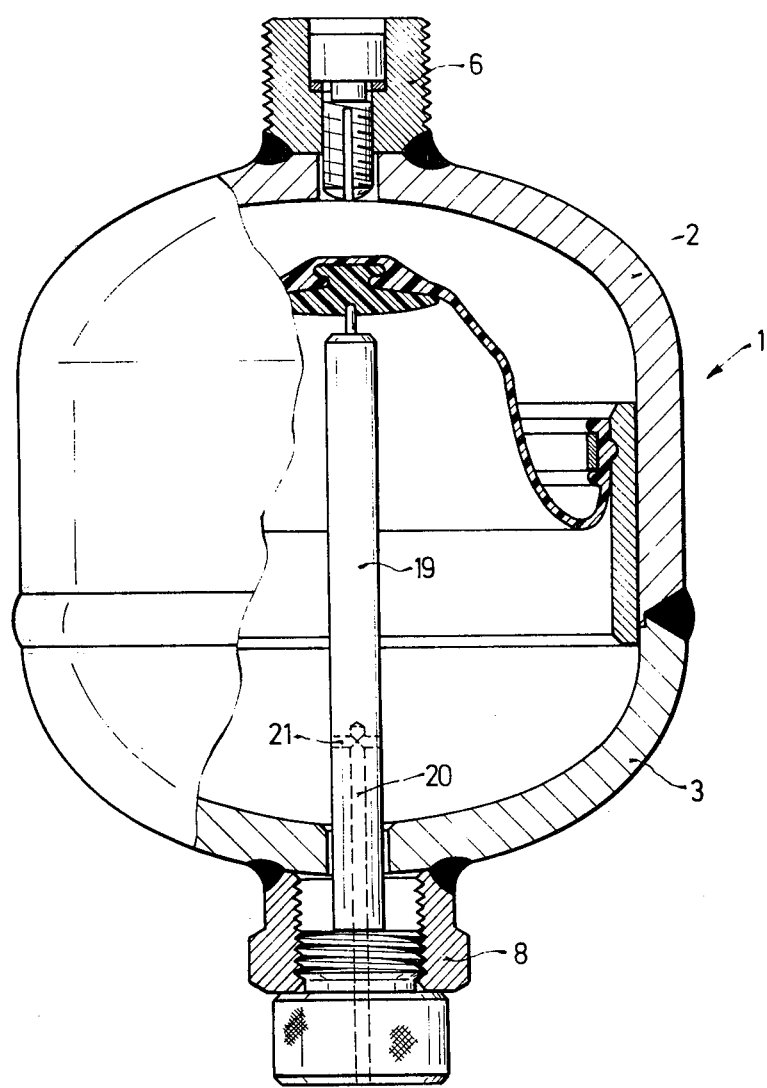
FIG. 2 is a side view partly in cross section of the pressure vessel shown in FIG. 1, and illustrating the arrangement of the various elements of the pressure vessel during a manufacturing step.

The above-described pressure vessel is preferably produced in the following manner. At the first step the bead 12 of the membrane 13 is placed in the annular groove 11 of the tubular member 10. Subsequently thereto the retainer ring 16 is placed against the upper edge of the membrane so that the latter and especially the annular bead 12 is tightly pressed into the annular groove 11. Subsequently thereto the soldering wire 18 is placed in the annular groove 17. Afterwards the tubular member 10, together with the membrane 13 fixed thereto, is pushed into the upper part 2 so that the lower edge 10' of the tubular member projects only a few millimeters beyond the lower edge of the annular projection 5. The lower outer part 3 is subsequently pushed over the tubular member until the annular projection 5 completely fills in the annular groove 4. A mandrel 19 is then introduced through the bore 9 so that the bottom part of the membrane 13 is pushed near the upper end of the upper outer part 2, as shown in FIG. 2. The mandrel 19 is provided in its lower portion with an axial bore 20 adapted to communicate with the interior of the lower part 3 by means of a transverse bore 21.

After introduction of the mandrel 19 the vessel is ready for welding. For this purpose, the vessel is placed into a welding apparatus in which the upper and lower parts 2 and 3 are continuously welded to each other by a V-shaped weld seam 22 and the welding process is preferably carried out under a protecting gas, for instance $CO_2$. Due to the heat produced during the welding process, the soldering wire 18 will melt and the soldering material will flow into the small clearance between the parts 2 and 3 and the tubular member 10 in the direction toward the lower edge 10' of the tubular member. Thereby it is immaterial whether the vessel is held in an upright or in a horizontal position since the soldering material will always flow in the direction toward the higher temperature. The annular projection 5 will assure that no soldering material will penetrate to the weld seam 22 so that any detrimental effect of such soldering material on the weld seam is positively prevented. The tubular member 10 is now tightly connected by the soldering material to the parts 2 and 3 and the compartments 14 and 15 are gas-tightly separated from each other.

During the above described procedure a reducing, $H_2$ containing, protective gas is introduced with slight overpressure through the bores 20, 21 of the mandrel 19 into the lower compartment 15. The mandrel 19 has in addition the purpose to keep the membrane 13 away from the highly heated portions of the parts 2 and 3 about the weld seam so that the membrane will not be damaged. After the aforementioned welding process, which is also known under the name "Sigma-welding," the pressure vessel is removed from the interior thereof. The pressure vessel is thus finished.

Of course it is also possible to carry out the welding in a conventional manner, that is without a protective gas atmosphere. Essential is only that the welding is carried in a continuous manner in order to produce a uniform heat distribution necessary for the soldering process. Instead metallic soldering material it is also possible to use a fusion adhesive in form of a wire or a foil, eventually also in form of granulates. Such fusion adhesive will melt through the welding heat in the same manner as the soldering wire. Instead of providing the groove 17 in the part 2, it is evidently also possible to provide such a groove for the soldering wire in the outer surface of the tubular member 10. Hard as well as soft soldering material may be used for the soldering process.

It will be understood that each of the elements described above, or two or more together, may also find a useful application in other types of hollow bodies differing from the types described above.

While the invention has been illustrated and described as embodied in a hollow body especially a pressure vessel, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hollow body, especially a pressure vessel, comprising, in combination, two hollow outer parts having annular end faces juxtaposed with one another; an inner tubular part extending to opposite sides of said end faces of said outer parts and having an outer surface closely adjacent to inner surfaces of said outer parts to align the latter with each other; means for fluid-tightly connecting said outer parts with each other including a substantially V-shaped groove formed by said end faces of said outer parts and ending at its apex short of the inner surface of said outer parts, and a fluid-tight weld seam filling said V-shaped groove and connecting said outer parts to each other; means for fluid-tightly connecting said inner tubular part with one of said outer parts including an annular groove provided at the inner surface of one of said outer parts, and a fusible material located in said annular groove between the outer surface of said inner tubular part and the inner surface of said one outer part and forming, after being melted and hardened, a further annular fluid-tight seam for connecting said inner tubular part to said one outer part, said fusible material being different from and of a lower melting point than the material of said weld seam, said annular groove and said fusible material being adjacent to and spaced from said weld seam at a distance sufficient for heat, applied during forming said weld seam, to penetrate into said fusible material so as to melt the same for forming said further seam; and an elastic separating membrane; means connecting said elastic separating membrane to said inner part to separate the interior of the hollow body into two chambers; and means for preventing the fusible material from penetrating to said weld seam during melting said fusible material which fusible material can otherwise detrimentally affect said weld seam, said preventing means including an annular projection provided at the end face of one of said outer parts and extending beyond the apex of said V-shaped groove, and a groove provided at the end face of the other outer part and receiving said projection therein.

* * * * *